United States Patent [19]

Andrews, Jr. et al.

[11] Patent Number: 5,539,714
[45] Date of Patent: Jul. 23, 1996

[54] ADAPTIVE RUNOUT COMPENSATION FOR MINIATURE DISK DRIVES

[75] Inventors: Thomas L. Andrews, Jr., Ward; Gary E. Counts, Arvada, both of Colo.

[73] Assignee: Integral Peripherals, Boulder, Colo.

[21] Appl. No.: 222,494

[22] Filed: Apr. 4, 1994

Related U.S. Application Data

[63] Continuation of Ser. No. 766,478, Sep. 25, 1991, abandoned.

[51] Int. Cl.$^6$ .................................................. G11B 7/00
[52] U.S. Cl. .................................. 369/44.26; 369/44.32; 360/77.04
[58] Field of Search ............................. 360/77.01, 77.05, 360/77.04, 77.06, 77.08; 369/54, 48, 44.26, 44.32, 32, 47

[56] References Cited

U.S. PATENT DOCUMENTS

| | | | |
|---|---|---|---|
| 4,138,741 | 2/1979 | Hedlund et al. | 360/77.05 |
| 4,516,177 | 5/1985 | Moon et al. | 360/77.08 |
| 4,594,622 | 6/1986 | Wallis | 360/77.05 |
| 4,628,379 | 12/1986 | Andrews, Jr. et al. | 360/77.05 |
| 4,630,190 | 12/1986 | Alaimo et al. | 360/77.05 |
| 4,907,214 | 3/1990 | Nagano et al. | 360/77.04 |
| 4,969,059 | 11/1990 | Volz et al. | 360/77.04 |
| 5,023,857 | 6/1991 | Verboom | 369/50 |
| 5,072,318 | 12/1991 | Yu | 360/77.04 |

*Primary Examiner*—Nabil Z. Hindi
*Attorney, Agent, or Firm*—Skjerven, Morrill, MacPherson, Franklin & Friel

[57] ABSTRACT

A secondary servo compensator, in a miniature disk drive having at least one disk and a servo system to position an actuator driven read/write head over any one of a number of tracks on the disk, provides on-line real-time compensation for disk runout that occurs during operation of the miniature disk drive. The servo system includes a servo compensator that has a gain and that generates an actuator position signal for positioning the read/write head over the track in response to a position error signal. The secondary servo compensator functions independently of the servo compensator. Specifically, the secondary servo compensator receives the position error signal and analyzes the disk runout and simultaneously generates a runout compensation signal during operation of the disk drive, i.e., while the disk drive is idle, reading, or writing. An actuator signal generator combines the actuator adjustment signal that is generated using the position error signal from sector "i" and the runout compensation signal that is generated using the position error signal for sector "i-1" to create a runout compensated actuator signal for sector "i". Hence, the runout compensation is fed forward. The servo system, using the information from the servo compensator and the secondary servo compensator, continuously maintains the read/write head over the desired track centerline independent of the offset of the center of the disk from true center of rotation.

44 Claims, 8 Drawing Sheets

5,539,714

ADAPTIVE RUNOUT COMPENSATION FOR MINIATURE DISK DRIVES

This application is a continuation of application Ser. No. 07/766,478, filed Sep. 25, 1991 now abandoned.

BACKGROUND OF THE INVENTION

1. Field of the Invention

This invention relates generally to reading and writing data on a magnetic storage medium and in particular to reading and writing data at a predetermined location on a magnetic storage medium when the center of the magnetic storage medium is displaced from the true center of rotation.

2. Prior Art

Typically, a disk drive contains one or more circular planar disks that are coated on each side with a magnetic medium. The disk or disks are mounted on a spindle that extends through the center of each disk so that the disks may be rotated at a predetermined speed, usually about 3600 rpm. Usually, one read/write head is associated with each side of the disk that is coated with a magnetic medium. The read/write head flies a small distance above the disk surface as the disk rotates. The read/write head, in response to signals from electronics associated with the disk drive, writes data at a predetermined location in the magnetic medium. Similarly, the read/write head, in response to other signals from the disk drive electronics, reads the stored data at a predetermined location.

The configuration of the data on the magnetic surface is instrumental in the operation of the disk drive. Data are recorded by read/write head 120 in concentric circular tracks 110 on disk 100 (FIG. 1). Corresponding tracks on different disk surfaces are cylindrically aligned.

Typically, each track is segmented into one or more parts that are referred to as sectors, e.g., sector 106, sector 107. Thus, the disk drive must move read/write head 120 radially across the disk surface to locate the track for reading or writing data and then must follow that track circumferentially until the desired sector passes under read/write head 120. Hence, read/write head 120 is positioned at a predetermined radial and circumferential position over the disk surface.

In a disk drive, each read/write head is usually affixed by an arm to a actuator and the actuator is moved so that the read/write head is moved radially to a specified track. This operation is referred to as a track seek, or sometimes just a seek. In a closed-loop disk drive, a servo system is used to move the actuator.

Many different servo systems have been developed for use in hard disk drives. In an embedded servo system, the read/write head reads a servo pattern contained in a servo field at the start of each sector to determine the radial and circumferential position of the read/write head relative to the disk. The information that is read is provided to the disk drive control loop electronics which in turn repositions the read/write head as necessary based on that information.

In large hard disk drives i.e., disk drives with a form factor of 3.5 inches or larger, the disks were clamped to the spindle with sufficient pressure to prevent displacement of the disk relative to the spindle by either starting torque or operational shock and vibration. To prevent distortion of the disks by the high clamping forces, the disk substrate was relatively stiff and as thick as 0.150 inches.

Unfortunately, the large hard disk drives are not suitable for use in portable computers because of the high profile and large form factor. A disk drive used in a portable computer preferably has a low profile and a 2.5 inch or smaller form factor. Such a disk drive is referred to herein as a miniature disk drive. The low profile design requires the use of thinner disk substrates which in some cases are as thin as 0.025 inches. Further, the low profile requires a compatible disk clamp. The reduction in the size of the disk clamp and the disk reduces the clamping region of the disk.

If the traditional high clamping forces are applied to the smaller clamping region, warpage and distortion of the disk substrate is highly probable. Such distortions are likely to result in data errors and even head crashes. Consequently, low profile disk clamps typically do not generate sufficient pressure on the disk to prevent radial slippage of the disk relative to the spindle. This problems is exacerbated because the shock and vibration that a miniature drive is subjected to in a portable computer may be up to 10 times greater than the shock and vibration in the large disk drives described above.

Thus, in miniature disk drives in general and in particular in small miniature disk drives in portable computers, shock and vibration forces on the disk drive will result in a random radial displacement between the disk and the spindle. The center of the spindle is referred to as the true center of rotation of the disk drive. As explained above, data are typically stored in concentric tracks on the disk. However, the random radial displacement of the disk would result in data tracks that are no longer concentric.

For example, initially disk 100 (FIG. 1) is centered about true center of rotation 101. Track 110 is written while disk 100 is in the centered position. A shock displaces disk 100 so that the center of the disk is located at position 102. Consequently, as the disk spins, read/write head 120 traverses over track 111. If data is now written on disk 100 in track 111, data in tracks concentric with track 110 are obliterated. Positional difference 130 between track 110 and track 111 is referred to as runout.

A practical closed loop servo system, such as that described above, can correct ninety percent of the read/write head positioning error. However, if the shock displaced disk 100 about 0.001 inches, the residual track positioning error for such a closed loop servo system is about ±100 microinches. If disk 100 has 2500 tracks per inch, the width of each data track is about 340 microinches with guard bands of 60 microinches. Thus, the position correction provided by the closed loop servo system is not sufficient to prevent new data from overwriting data written on adjacent tracks prior to the displacement.

If miniature disk drives are to be reliably used in portable computers, runout compensation is required beyond that provided by the closed loop servo system. One prior art runout compensation system for a large hard disk drive with a removable disk pack is described in U.S. Pat. No. 4,628,379 issued to Thomas L. Andrews, Jr. et al. on Dec. 9, 1986, which is incorporated herein by reference. In this system, servo field position information is read by read/write head 230 (FIG. 2) and provided to position determining circuit 232. Position determining circuit 232 provides information to sector index determining circuit 238 which in turn provides microprocessor 240 with index and sector numbers.

Position determining circuit 232 provides an analog position error signal to analog to digital (A/D) converter 236 and to hardware summing junction 246. A/D converter 236 sends microprocessor 240 a digital position error signal. In the runout processing performed in microprocessor 240, the runout is represented as a sinusoid using only the fundamental frequency and the offset average. A discrete Fourier transform for a single frequency is performed. To obtain sufficient data for the runout compensation, a track is sampled eight complete times to obtain an average distance value for each sector in the track.

After microprocessor 240 performs the Fourier analysis, microprocessor 240 provides digital-to-analog (D/A) converter 244 a digital compensating signal. D/A converter 244 in turn provides summing junction 248 with an analog signal. Summing junction 248 combines the position error signal from circuit 232 and the analog compensating signal from D/A converter 249 and provides the resulting signal to hardware compensator 248. Compensator 248 generates a signal that is amplified and used to reposition read/write head 230.

This compensation system was used in a relatively low density disk drive that had removable disk packs. The runout compensation was for the problems associated with re-establishing the center of rotation after reseating the disk pack on various spindles under random physical conditions.

A serious limitation of this runout compensation system is that there is not a basis for determining when the runout compensation should be applied. For the removable disk pack, the runout compensation was used for a single track on each disk surface upon power-up. The runout compensation was not suitable for use on a real-time basis during disk drive operation. For example, sampling one track on one disk surface for eight revolutions prior to a seek requires at least 133 milliseconds which is an unacceptable seek time.

Since the runout may change during operation in miniature disk drives, performing runout compensation only at power-up, as for the removable disk pack, is not acceptable. Moreover, there is no indicator that the disk has been displaced and so no basis for determining when to use the runout compensation. Thus, the system described above is not practical in a miniature disk drive. Consequently, while the need for runout compensation is recognized, a practical solution with reasonable time performance and adequate compensation on a real-time basis is needed.

SUMMARY OF THE INVENTION

According to the principles of this invention, a secondary servo compensator is provided in a miniature disk drive having at least one disk and a servo system to position an actuator driven read/write head over any one of a number of tracks on the disk. The servo system includes a servo compensator that has a gain and that generates an actuator position adjustment signal for positioning the read/write head over the track in response to a position error signal. The secondary servo compensator functions independently of the servo compensator and provides on-line real-time compensation for disk runout that occurs during operation of the miniature disk drive.

Specifically, the secondary servo compensator receives the position error signal for a sector and during the sector period, analyzes the disk runout and generates a runout compensation signal. An actuator signal generator combines the actuator position adjustment signal from the servo compensator in response to the position error signal for sector "i" and the runout compensation signal from the secondary servo compensator in response to the position error signal for sector "i-1," where "i" is a sector number, to create a runout compensated actuator adjustment signal. The servo system positions the read/write head over the track in response to the runout compensated actuator adjustment signal.

Since the secondary servo compensator is always operative, the secondary servo compensator detects when the disk is displaced from the center of rotation of the disk drive and provides runout compensation in real-time. Thus, the servo system, using the information from the servo compensator and the secondary servo compensator, continuously maintains the read/write head over the desired track centerline independent of the offset of the center of the disk from true center of rotation of the disk drive.

In one embodiment, the secondary servo compensator includes a disk runout analyzer means and a runout compensation generator means that operate simultaneously. The analyzer means processes the position error signal for each sector in one or more analysis revolutions of the disk and produces a runout factor. The generator means uses an accumulated runout factor from the previous analysis revolutions to generate a sector runout correction signal during the operation of the miniature disk drive thereby providing the adaptive runout compensation of this invention.

According to the principles of this invention, a novel method is used to provide real-time on-line compensation for disk runout. The method includes the steps of:

(i) analyzing sector runout and simultaneously generating a sector runout compensation signal for each sector during a predetermined number of revolutions of a disk while the disk drive is operating;

(ii) generating a runout compensation signal for each sector during the next revolution of said disk following said predetermined number of revolutions of said disk thereby allowing the servo system to settle; and repeating steps (i) and (ii).

DETAILED DESCRIPTION

Figure 1:
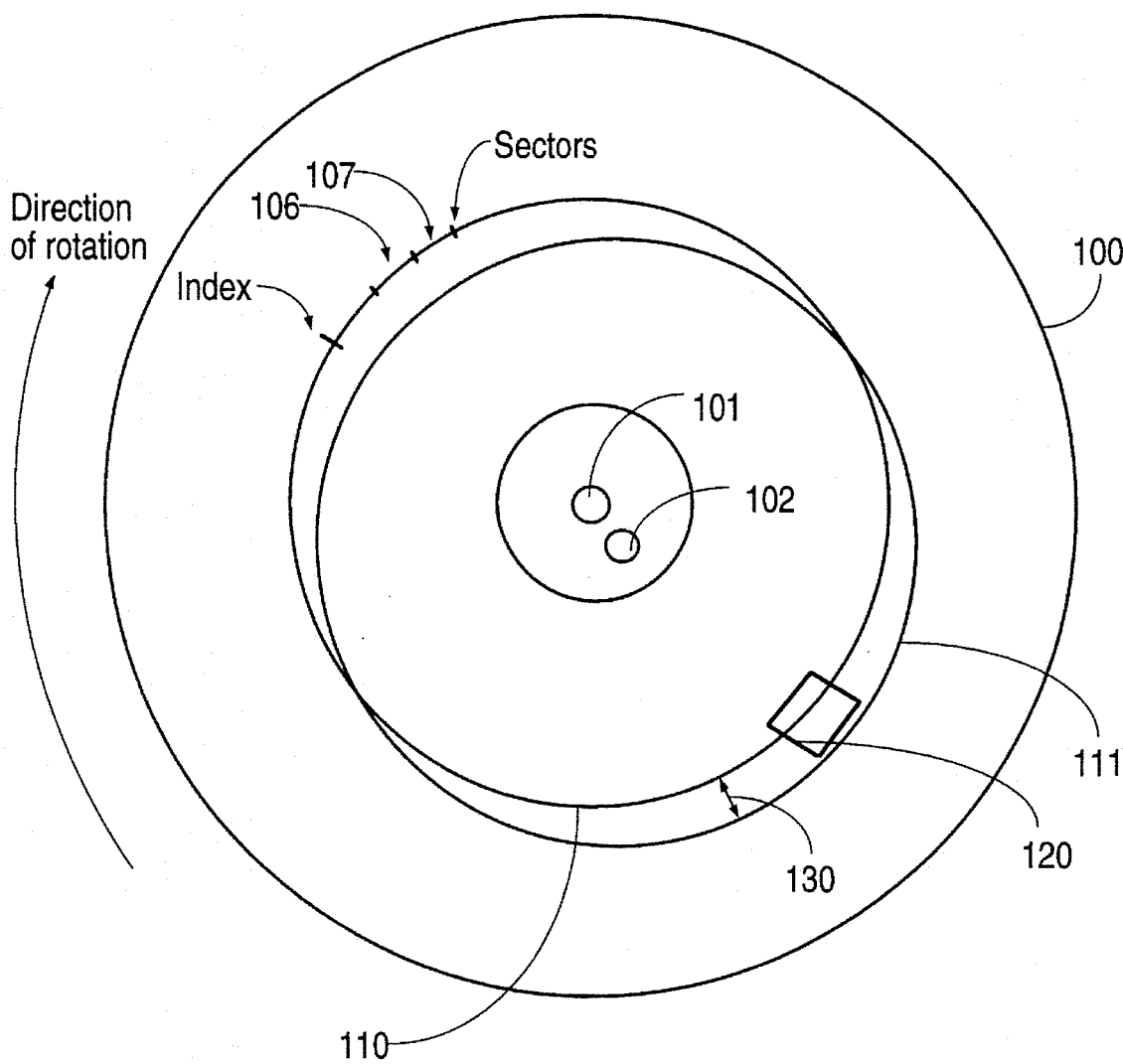
FIG. 1 illustrates disk runout when the center of a disk is displaced relative to the time center of rotation.
Figure 2:
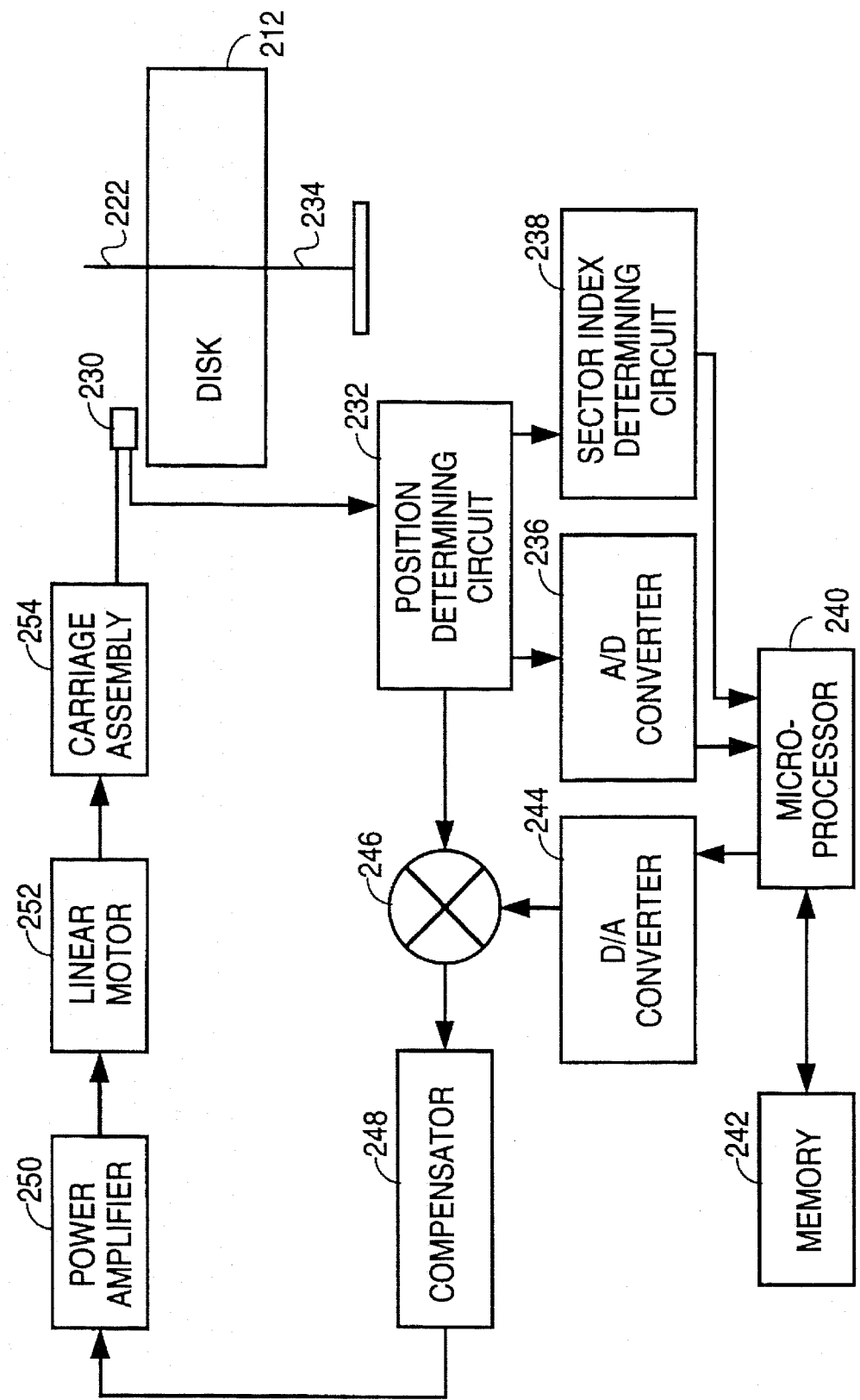
FIG. 2 is a block diagram of prior art disk drive closed loop servo system that includes a runout compensation system.
Figure 3:
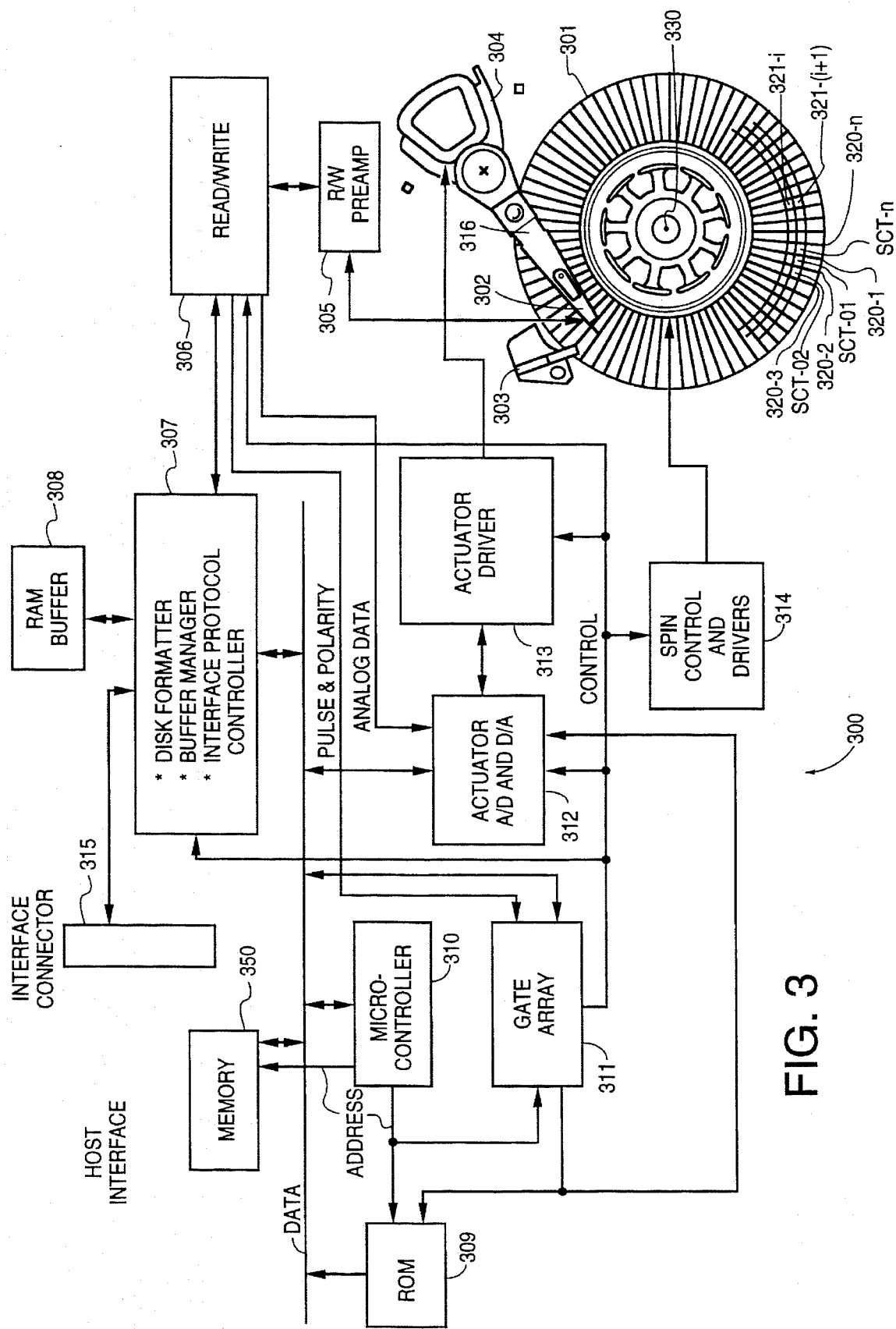
FIG. 3 illustrates a miniature disk drive that includes the adaptive runout compensation system of this invention.

According to the principles of this invention, a novel disk runout compensation system, which is described more completely below, is used in a miniature disk drive 300 (FIG. 3). Disk drive 300 contains one or more circular planar disks 301. Each disk is coated on at least one side with a magnetic medium as in the prior art disk. Data are recorded by read/write head 302 in concentric circular tracks on the disk, e.g. tracks 321-i and 321-(i+1). Corresponding tracks on different disk surfaces are approximately cylindrically aligned.

Each track is segmented into one or more sectors SCT-01, SCT-02, ..., SCT-n by prerecorded information in embedded servo field regions 320-1 through 320-n. Each servo field region 320-j where j=1, 2, ..., n, includes m servo fields, where m is the number of concentric circular data tracks on disk, i.e., one servo field in each data track at position j for a total of nm servo fields per surface. In one embodiment, as described more completely below, disks 301 are 1.89 inches (48 mm) in diameter and have 632 data tracks.

The interface of disk drive 300 with a computer system and the electronics required in conjunction with an embedded servo system to read and write data on disk 301 in response to signals from a disk controller to interface connection 315 are known to those skilled in the art. The radial and circumferential positioning of read/write head 302 using embedded servo data and a servo system is also well known. In this particular system, the servo system includes R/W preamp 305, combined read/write circuit 306, actuator A/D and D/A circuit 312, actuator driver circuit 313, gate array 311, and microcontroller 310.

In addition, microcontroller 310 has access to memory 350 for storing and retrieving data. Upon power-up of disk drive 300, firmware for a proportional integral difference (PID) servo compensator, seek control, and a secondary servo compensator of this invention in ROM 309 is loaded into microcontroller 310. In this embodiment microcontroller 310 is a 46100(HPC+) microprocessor supplied by National Semiconductor of Santa Clara, Calif.

The servo compensator in microcontroller 310 receives a digital position error signal for a sector in the track and determines the position correction needed to position read/write head 302 over the centerline of the track for that sector. The position correction is used to generate a servo compensation signal for that sector. The servo compensator applies a gain factor to the servo compensation signal to create a digital actuator position adjustment signal for that sector.

Microcontroller 310 sends the digital actuator position adjustment signal to a D/A converter that resides in actuator A/D and D/A circuit 312. The actuator position adjustment signal is processed and applied to the actuator in a conventional fashion. This process is sequentially repeated for each sector in a track.

The particular system illustrated in FIG. 3 is described more completely in copending, commonly assigned, and concurrently filed U.S. patent application Ser. No. 07/766,480 of Morehouse et al. filed on Sep. 25, 1991 and entitled "Microminiature Hard Disk Drive," now U.S. Pat. No. 5,379,171, issued on Jan. 3, 1995, which is incorporated herein by reference in its entirety. See also, copending and commonly assigned U.S. patent application Ser. No. 07/629,948 of Morehouse et al. filed on Dec. 19, 1990 and entitled "Miniature Hard Disk Drive For Portable Computers, now abandoned" which is incorporated herein by reference in its entirety.

Disk 301 is clamped to the disk drive as described in copending, commonly assigned and concurrently filed herewith, U.S. patent application Ser. No. 07/765,358, entitled "Clamp for Information Storage Disk," now U.S. Pat No. 5,243,481, issued on Sep. 7, 1993 of James Dunckley, which is incorporated herein by reference in its entirety. The disk clamp does not apply sufficient pressure on disk 301 to hold it rigidly in place about the center of rotation 330 of disk drive 300. Therefore, if disk drive 300 is subjected to vibration or shock, disk 301 is likely to be radially displaced and the center of the disk will be displaced from true center of rotation 330. As explained above, the servo system can not reliably position read/write head 302 in these circumstances.

Figure 4:
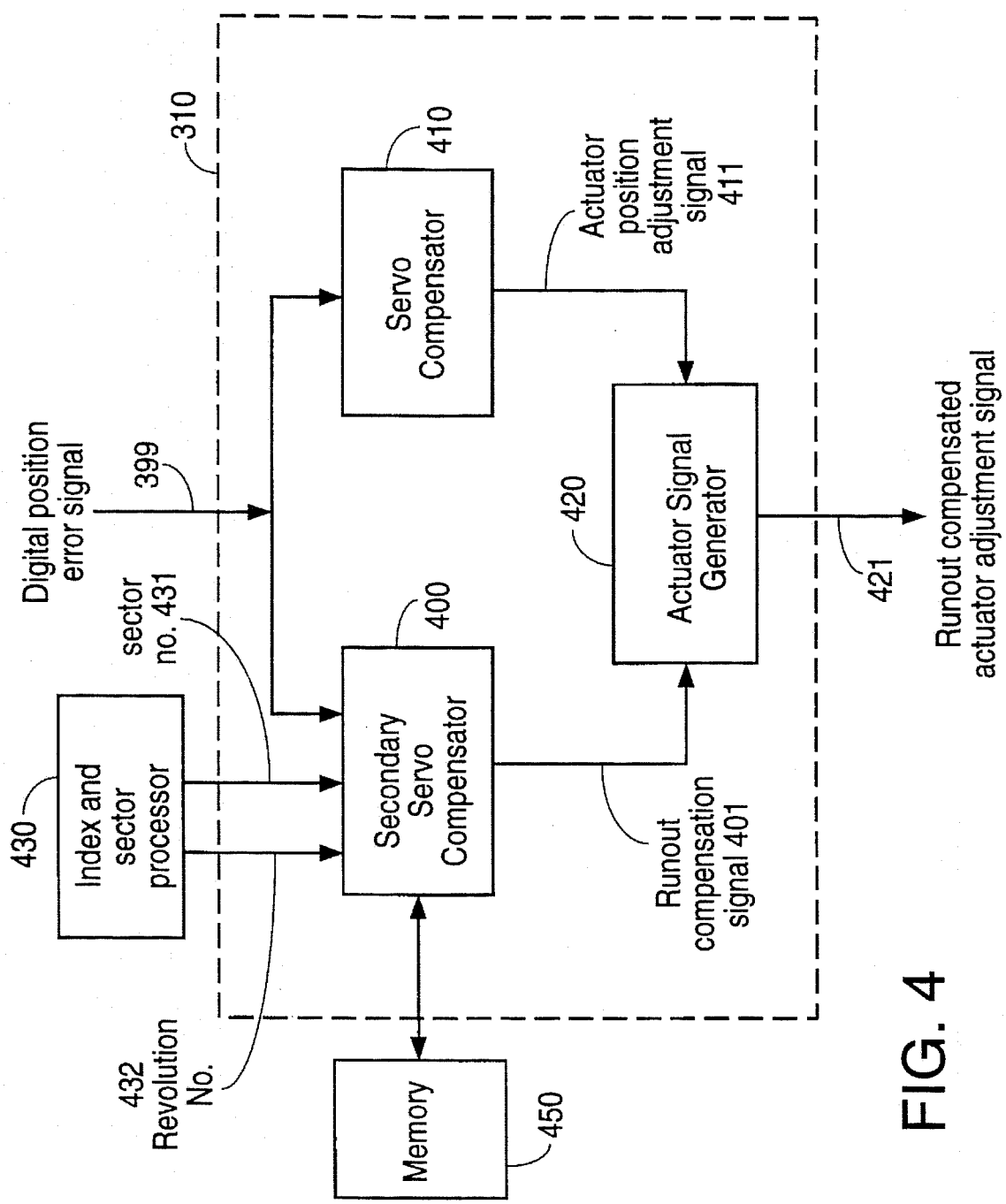
FIG. 4 is a block diagram of the adaptive runout compensation system of this invention that illustrates its relationship with the servo compensator of the disk drive.

Thus, according to the principles of this invention, a secondary servo compensator 400 (FIG. 4) is provided in microcontroller 310. Secondary servo compensator 400 functions independently of servo compensator 410 and provides on-line real-time compensation for disk runout that occurs during operation of disk drive 300. Specifically, servo compensator 410 receives position error signal 399 and generates actuator position adjustment signal 411, as described above. Simultaneously, secondary servo compensator 400 receives position error signal 399, and as described more completely below, analyzes the disk runout and simultaneously generates a runout compensation signal 401 during operation of disk drive 300, i.e., while disk drive 300 is idle, reading, or writing.

Actuator signal generator 420 combines actuator adjustment signal 411 that is generated using position error signal 399 from sector "i" and runout compensation signal 401 that is generated using position error signal 399 for sector "i-1" to create a runout compensated actuator signal 421 for sector "i". Here "i" is a sector number. Hence, the runout compensation is fed forward when microcontroller 310 provides runout compensated actuator adjustment signal 421 to the servo system. The servo system, using the information from servo compensator 410 and secondary servo compensator 400, continuously maintains read/write head 302 over the desired track centerline independent of the offset of the center of disk 301 from true center of rotation 330.

Notice that the hardware summing junction and compensator of the prior art system described above are eliminated. Therefore, not only does secondary servo compensator 400 provide runout compensation in real-time but also the elimination of hardware facilitates incorporation of secondary servo compensation in miniature disk drives.

Unlike the prior art system, that required multiple revolutions to generate a runout correction and was useful only upon start-up of the disk drive before a read or a write was performed, secondary servo compensator 400 continuously monitors the position of disk 301 relative to true center of rotation 330 and generates runout compensation signal 401 while disk 301 is being used. Since runout compensation signal 401 is generated during operation of miniature disk drive 300, the adaptive runout compensation is transparent to the user.

Index and sector processor 430 provides secondary servo compensator 400 sector number 431 over which read/write head 302 is positioned and a revolution number 432. One embodiment for encoding the index and sector data in the embedded servo field for uniquely identifying each sector and rapidly establishing the index is disclosed in copending, commonly assigned, and concurrently filed herewith U.S. patent application Ser. No. 07/765,348, entitled "An Embedded Servo System For Low Power Disk Drives" now U.S. Pat. No. 5,321,560 issued on Jun. 14, 1994 of Stephen Cowen, which is incorporated herein by reference in its entirety.

Figure 5:
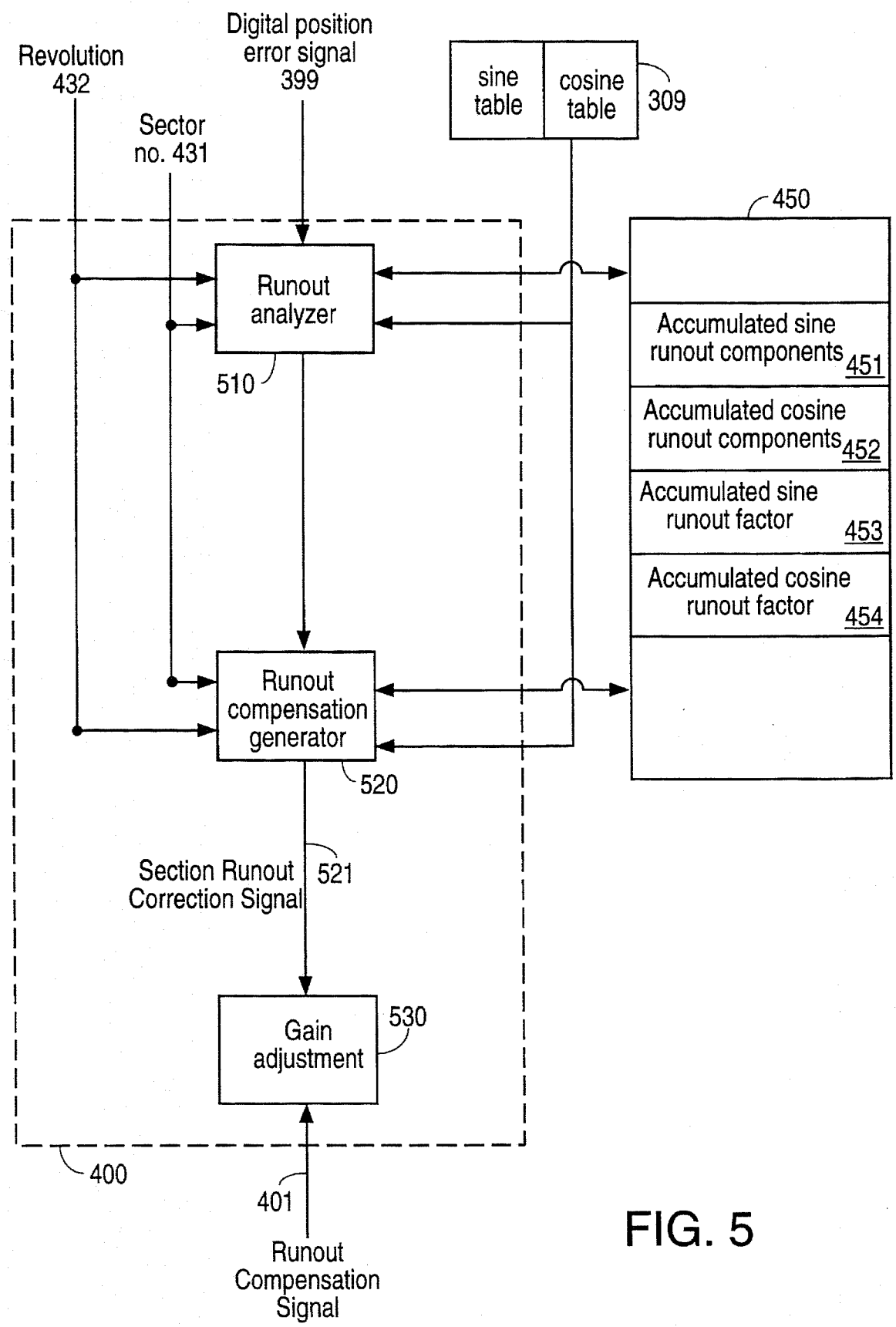
FIG. 5 is a detailed block diagram of the secondary servo compensator of this invention.
Figure 6A:
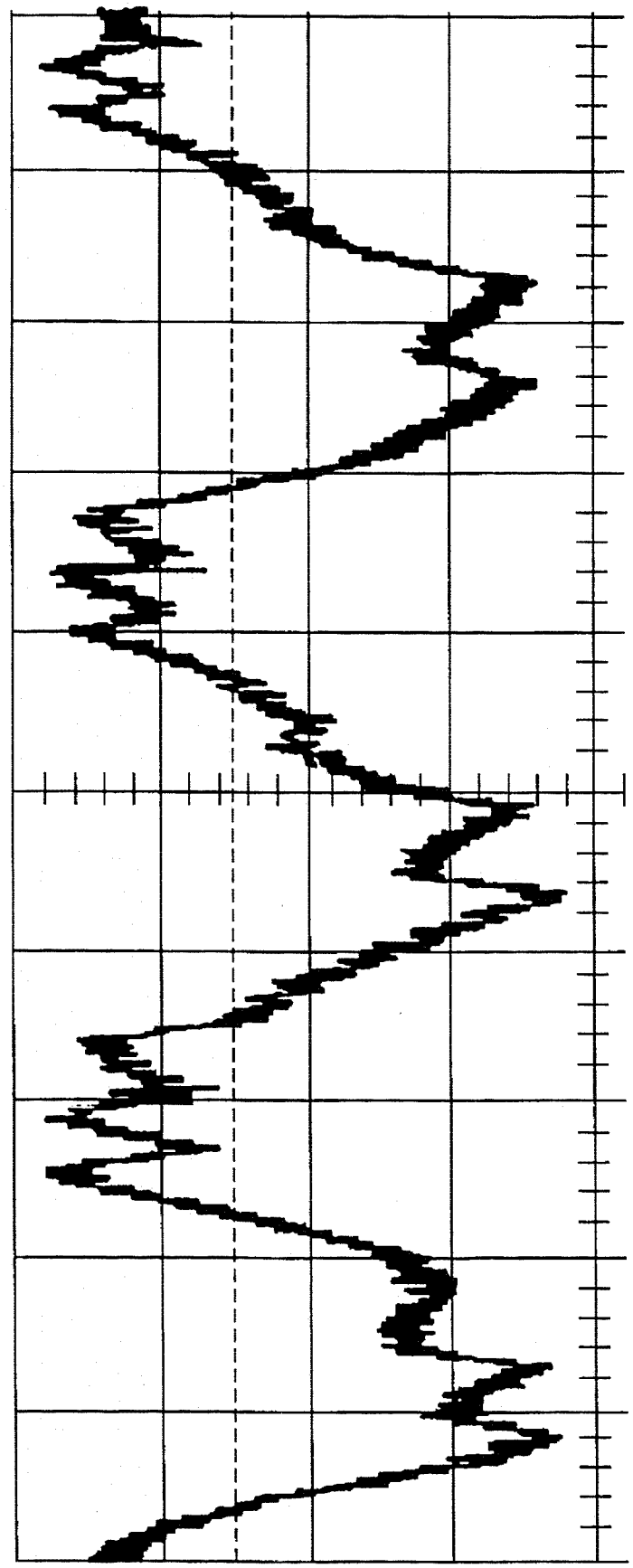
FIG. 6A is an example of a position error signal.

FIG. 5 is a more detailed block diagram of secondary servo compensator 400. Secondary servo compensator 400 includes a runout analyzer 510 and a runout compensation generator 520 that each receive sector number 431 and revolution number 432 from index and sector processor 430. Runout analyzer 510 sequentially receives digital position error signal 399 for each sector in a track, i.e., for each sector in a revolution of disk 301. Position error signal 399 contains many harmonic and nonrepetitive components for disturbances other than runout, such as windage, bearing noise and servo settling transients. For example, FIG. 6A illustrates a typical position error signal 399. Runout analyzer 510 filters position error signal 399 to obtain the fundamental runout frequency sector by sector.

The filtering process in runout analyzer 510 preferably starts with the index sector and proceeds for each sector in a track. The filtering process separates the sector runout component from the position error signal during the sector period. The sector runout component for each sector in a predetermined number of analysis revolutions n of disk 301 are accumulated in memory 450, i.e., each sector runout component is added to the sum of sector runout components stored in memory 450.

After all the sectors in the predetermined number of analysis revolutions n are processed, runout analyzer 510 produces an averaged value of the sector runout components accumulated in memory 450. The averaged value is a runout factor that is also stored in memory 450. As explained more completely below, during the predetermined number of analysis revolutions n, runout compensation generator 520 is continuously generating, sector by sector, runout compensation signal 401.

As the next revolution of disk 301 starts after the predetermined number of analysis revolutions n, the sector runout components from runout analyzer 510 are not accumulated in memory 450 and are simply ignored. As runout compensation generator 520 receives the sector number for each sector in the next revolution of disk 301, generator 520 uses the runout factor stored in memory 450 to generate a sector runout correction signal 521 for that sector.

Sector runout correction signal 521 is provided to gain adjustment means 530. In one embodiment, gain adjustment means 530 multiplies the sector runout correction signal 521 by the same gain factor that is used in servo compensator 410 to generate runout compensation signal 401. However, the gain factor used in gain adjustment means 530 may be equal or less than the gain factor in servo compensator 410. In some servo systems, the gain factor used in gain adjustment means 530 is less than the gain factor used in servo compensator 410 to maintain stability of the servo system.

Since runout analyzer 510 and runout compensation generator 520 require about one sector period to produce the runout compensation, runout compensation signal 401 is fed forward to the next sector. Hence, runout compensation signal 401 for sector "i-1" is combined with actuator position adjustment signal 411 for sector "i" by actuator signal generator 420 as described above, where sector "i" is adjacent to and follows sector "i-1" in a revolution.

The output from runout analyzer 510 is not used in this revolution to permit settling of the servo system. While a single settling revolution is described herein, the important factor is to provide sufficient revolutions for the servo system to settle before further adjusting the runout compensation.

After the servo settling revolution, runout analyzer 510 and runout compensation generator 520 are both utilized on the next revolution of disk 301 to maintain read/write head 302 properly positioned. Runout compensation generator 520 continues to generate sector by sector runout compensation signal 401 as just described, i.e., using the runout factor from the prior runout analysis that is stored in memory 450. Simultaneously, runout analyzer 510 produces a new runout factor for the predetermined number of analysis revolutions n. Thus, secondary servo compensator 400 is updating the runout error data at the same time as it is compensating for runout.

After all the sectors in the predetermined number of analysis revolutions n are processed, a new runout factor is produced for the n revolutions. The new runout factor is added to the runout factor stored in memory 450 and the accumulated runout factor is then stored in memory 450, i.e., the runout factor is updated. Thus, runout analyzer 510 includes a means for accumulating the runout factor during operation of disk drive 300.

After the runout factor is updated, the output from runout analyzer 510 is ignored during the next revolution of disk 301 and runout compensator generator 520 operates using the accumulated runout factor in memory 450. This sequence of (i) generating a runout compensation signal and simultaneously analyzing the runout sector by sector for a predetermined number of revolutions, and (ii) generating a runout compensation signal for a single revolution to allow the servo system to settle is repeated continuously.

Thus, memory 450 contains a runout factor that is a summation over time of averaged sector by sector runout components. As is known to those skilled in the art, such a summation tends to smooth the response of a system and ameliorate problems associated with short transients. Also, the accumulation of runout factors over time prevents discontinuities and assures that read/write head 302 is maintained over the track centerline. Secondary servo compensator 400 provides a reliable continuous online real time runout compensation signal so that data is not overwritten as a consequence of disk slippage that occurs during operation. Hence, secondary servo compensator 400 provides adaptive runout compensation for miniature disk drives.

A more detailed description of one embodiment of the adaptive runout compensation system of this invention is given below. This embodiment is illustrative only of a preferred embodiment of the invention and is not intended to limit the invention to the particular embodiment described.

In this embodiment, the filtering process used in runout analyzer 510 is a discrete Fourier transform. As is known to those skilled in the art, the Fourier transform decomposes periodic waveforms into sine and cosine components. Here, only the fundamental frequency of the disk runout is of interest. The discrete Fourier transform separates the disk runout from the position error signal and gives a cosine runout component and a sine runout component, i.e., the runout component has two parts in this embodiment.

To create a period for the sine and cosine functions used in the discrete Fourier transform, one revolution of disk 301 is taken as the period. Thus, the sine and cosine functions are evaluated for each sector in the track where the sectors are numbered from zero to (m-1) and where in this embodiment m is 72.

The discrete Fourier transform generates two runout transform terms, sometimes referred to as runout components. The first runout component is given by:

$$SineRunout_S = PES \cdot \sin\left[\frac{2 \cdot \pi}{(Tot.\ Sectors)} \cdot S\right] \quad (1)$$

where

S=sector number being analyzed where S=0, 1, . . . , ((Tot. Sectors)−1);

Tot. Sectors=total number of sectors per disk revolution; and

PES=the position error signal

Similarly, the second runout component is given by:

$$CosineRunout_S = PES \cdot cosine\left[\frac{2 \cdot \pi}{(Tot. Sectors)} \cdot S\right] \quad (2)$$

where

S=number of sector being analyzed where S=0, 1, ..., ((Tot. Sectors)−1);

Tot. Sectors=total number of sectors per disk revolution; and

PES=the position error signal.

In this embodiment, second runout components "CosineRunout$_S$" and first runout components "SineRunout$_S$" are each accumulated in memory 450 for the predetermined number of analysis revolutions n. Secondary servo compensator 400 runs in real time and so the runout must be analyzed and runout compensation generated within a sector period. Hence, to speed operation of secondary servo compensator 400, the cosine term in second runout component "CosineRunout$_S$" and the sine term in first runout component "SineRunout$_S$" are not repeatedly calculated. Rather, a table of the cosine terms for each sector and a table of the sine terms for each sector are accessed in ROM 309. Of course, microcontroller 310 could be used to generate the sine and cosine terms once upon power-up of the disk driven and the resulting tables could be stored in memory 450.

The representational values used in one embodiment of the sine table and the cosine table are given in Tables 1 and 2 respectively. The values given are in decimal. These numbers are mapped to byte values, i.e., seven data bits plus a sign bit.

TABLE 1

SINE TERM TABLE

| Sector No. | Sine Term | Sector No. | Sine Term | Sector No. | Sine Term | Sector No. | Sine Term |
|---|---|---|---|---|---|---|---|
| 0 | 0 | 18 | −127 | 36 | 0 | 54 | 127 |
| 1 | −11 | 19 | −127 | 37 | 11 | 55 | 127 |
| 2 | −22 | 20 | −125 | 38 | 22 | 56 | 125 |
| 3 | −33 | 21 | −123 | 39 | 33 | 57 | 123 |
| 4 | −43 | 22 | −119 | 40 | 43 | 58 | 119 |
| 5 | −54 | 23 | −115 | 41 | 54 | 59 | 115 |
| 6 | −64 | 24 | −110 | 42 | 64 | 60 | 110 |
| 7 | −73 | 25 | −104 | 43 | 73 | 61 | 104 |
| 8 | −82 | 26 | −97 | 44 | 82 | 62 | 97 |
| 9 | −90 | 27 | −90 | 45 | 90 | 63 | 90 |
| 10 | −97 | 28 | −82 | 46 | 97 | 64 | 82 |
| 11 | −104 | 29 | −73 | 47 | 104 | 65 | 73 |
| 12 | −110 | 30 | −63 | 48 | 110 | 66 | 63 |
| 13 | −115 | 31 | −54 | 49 | 115 | 67 | 54 |
| 14 | −119 | 32 | −43 | 50 | 119 | 68 | 43 |
| 15 | −123 | 33 | −33 | 51 | 123 | 69 | 33 |
| 16 | −125 | 34 | −22 | 52 | 125 | 70 | 22 |
| 17 | −127 | 35 | −11 | 53 | 127 | 71 | 11 |

TABLE 2

COSINE TERM TABLE

| Sector No. | Cosine Term | Sector No. | Cosine Term | Sector No. | Cosine Term | Sector No. | Cosine Term |
|---|---|---|---|---|---|---|---|
| 0 | 127 | 18 | −11 | 36 | −127 | 54 | 11 |
| 1 | 125 | 19 | −22 | 37 | −125 | 55 | 22 |
| 2 | 123 | 20 | −33 | 38 | −123 | 56 | 33 |
| 3 | 119 | 21 | −43 | 39 | −119 | 57 | 43 |
| 4 | 115 | 22 | −54 | 40 | −115 | 58 | 54 |
| 5 | 110 | 23 | −64 | 41 | −110 | 59 | 64 |
| 6 | 104 | 24 | −73 | 42 | −104 | 60 | 73 |
| 7 | 97 | 25 | −82 | 43 | −97 | 61 | 82 |
| 8 | 90 | 26 | −90 | 44 | −90 | 62 | 90 |
| 9 | 82 | 27 | −97 | 45 | −82 | 63 | 97 |
| 10 | 73 | 28 | −104 | 46 | −73 | 64 | 104 |
| 11 | 63 | 29 | −110 | 47 | −63 | 65 | 110 |
| 12 | 54 | 30 | −115 | 48 | −54 | 66 | 115 |
| 13 | 43 | 31 | −119 | 49 | −43 | 67 | 119 |
| 14 | 33 | 32 | −123 | 50 | −33 | 68 | 123 |
| 15 | 22 | 33 | −125 | 51 | −22 | 69 | 125 |
| 16 | 11 | 34 | −127 | 52 | −11 | 70 | 127 |
| 17 | 0 | 35 | −127 | 53 | 0 | 71 | 127 |

Prior to considering the use of the discrete Fourier transform in runout analyzer 510, the predetermined number of revolutions n used by runout analyzer 510 must be defined. The minimum number of predetermined revolutions is one. However, to obtain better sampling, a larger number of revolutions is preferred. The maximum number of revolutions is limited by the word length used to store the accumulated runout factor in memory 450 and the maximum radial displacement of disk 301.

If the accumulated runout factor overflows for the maximum displacement, the runout compensation becomes meaningless. In this embodiment, the word length is 16 bits and considering the maximum radial displacement of disk 301, four revolutions were selected as the predetermined number of analysis revolutions.

Figure 7:
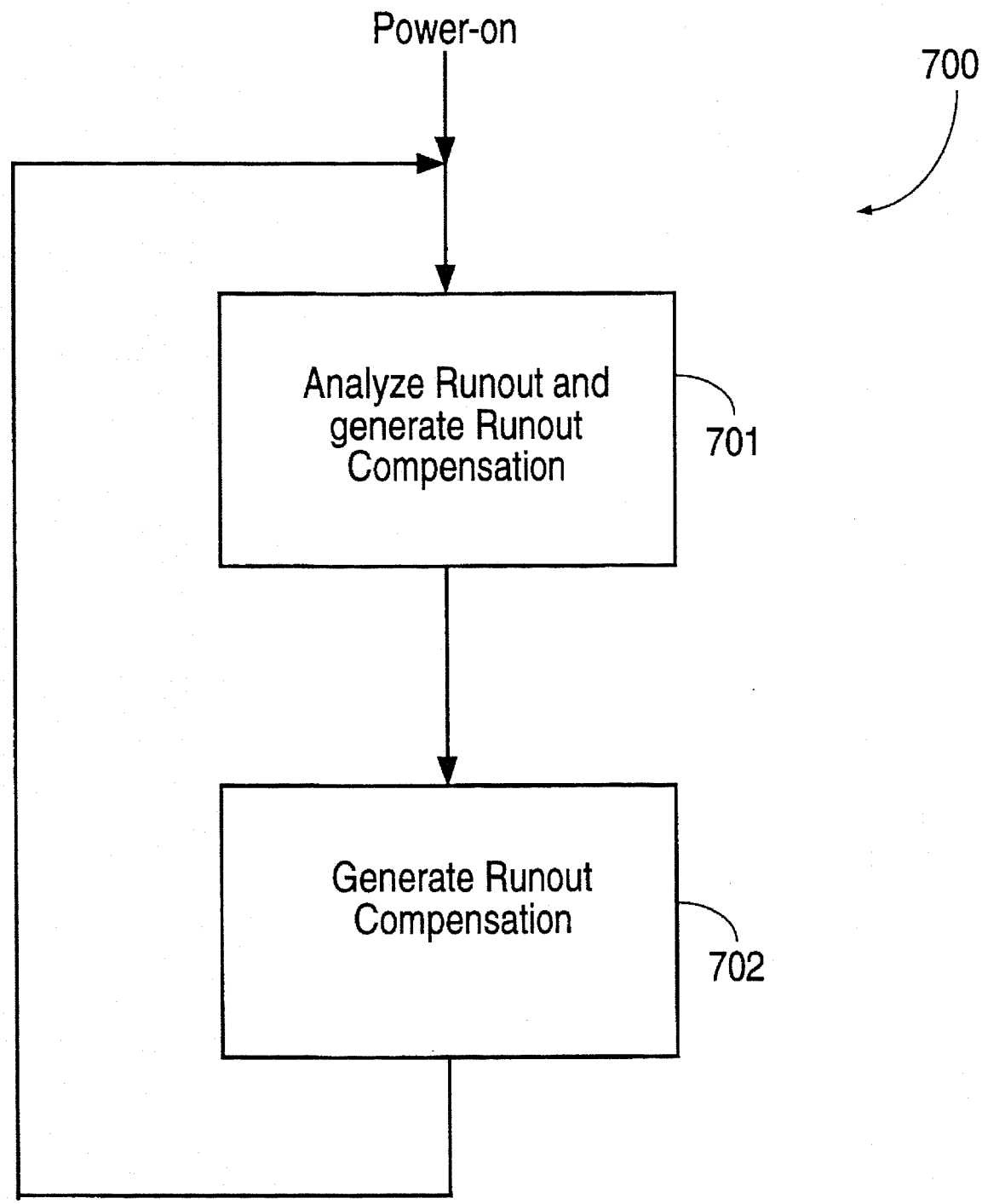
FIG. 7 is a flow diagram of the adaptive runout compensation method of this invention.

The first step in adaptive compensation method 700 of this invention is analyze runout and simultaneously generate runout compensation 701 (FIG. 7). Upon power-up of disk drive 300, memory locations in memory 450 that are used by secondary servo compensator 400 are zeroed. When the disk reaches a valid spin speed, secondary servo compensator 400 is started.

Runout compensation generator 520 generates a null signal for runout compensation during the first predetermined number of analysis revolutions n after a valid spin speed is reached. As explained above, runout compensation generator 520 uses the runout factor stored in memory 450 to generate runout correction signal 521. Since initially the stored runout factor is zero, sector runout correction signal 521 for each sector in a revolution is also zero, and consequently runout compensation signal 401 is zero.

For each sector for the predetermined number of analysis revolutions n, runout analyzer 510 retrieves the sine term from the sine table (TABLE 1 above) in ROM 309 for sector number 431 received from index and sector processor 430. Runout analyzer 510 multiplies the sine term by position error signal 399 for sector number 431 to obtain first runout component "SineRunout$_S$" for that sector. First sector runout components "SineRunout$_S$" are accumulated in location 451 in memory 450. Specifically, each sector runout component "SineRunout$_S$" is added to the accumulated sum of first sector runout components stored in location 451 and the new accumulated sum is saved in location 451.

Similarly, for each sector for the predetermined number of analysis revolutions n, runout analyzer 510 retrieves the cosine term from the cosine table (TABLE 2 above) in ROM 309 for sector number 431 received from index and sector processor 430 and multiplies the cosine term by position error signal 399 to obtain second sector runout component "CosineRunout$_S$". The second sector runout components are accumulated in memory 450 at location 452.

Thus, the value at location 451 in memory 450 after the n analysis revolutions is:

$$\text{Accumulated } SineRunout = \sum_{F=0}^{n-1} \sum_{S=0}^{m-1} SineRunout_S \quad (3)$$

where

S=sector number being analyzed where S=0, 1, . . . ,(m–1);

m=total number of sectors per disk revolution;

F=revolution number being analyzed where F=0, 1, . . . , (n–1); and n=predetermined number of analysis revolutions.

and the value at location 452 in memory 450 after the n analysis revolutions is:

$$\text{Accumulated } CosineRunout = \sum_{F=0}^{n-1} \sum_{S=0}^{m-1} CosineRunout_S \quad (4)$$

where

S=sector number being analyzed where S=0, 1, . . . , (m–1);

m=total number of sectors per disk revolution;

F=revolution number being analyzed where F=0, 1, . . . , (n–1); and n=predetermined number of analysis revolutions.

Recall that runout analyzer 510 produces a runout factor using the accumulated sector runout component stored in memory 450. Since the accumulated sector runout component is separated into accumulated sine runout components and accumulated cosine runout components in this embodiment, the runout factor is also separated into a sine runout factor and a cosine runout factor. Hence, after each sector in the predetermined number of analysis revolutions n has been processed, runout analyzer 510 forms a sine runout factor, "SineFactor" that is an , averaged value of the accumulated sine runout components. Specifically, the sine runout factor is:

$$SineFactor = 2 \cdot \frac{[\text{Accumulated } SineRunout]}{m \cdot n} \quad (5)$$

where n=predetermined number of analysis revolutions; and m=total number of sectors per disk revolution;

The cosine runout factor, i.e., the averaged value of the cosine runout components, is:

$$CosineFactor = 2 \cdot \frac{[\text{Accumulated } CosineRunout]}{m \cdot n} \quad (6)$$

where n=predetermined number of analysis revolutions m=total number of sectors per disk revolution;

The sine runout factor and the cosine runout factor are stored in memory 450 at locations 453 and 454, respectively. As explained above, in this embodiment, locations 453 and 454 are each 16 bits in length. This completes step 701 of adaptive runout compensation method 700 of this invention.

In generate runout compensation step 702 of adaptive runout compensation method 700, which begins on the next revolution of disk 301 following the predetermined number of analysis revolutions n in step 701, the two runout components from runout analyzer 510 for each sector are not accumulated in memory 450. For each sector, as indicated by sector number 431, runout compensation generator 520 first retrieves the appropriate sine term from the sine table (TABLE 1 above) in ROM 309 for the sector number and then multiplies the sine term by the sine runout factor retrieved from memory location 453 to form an inverse sine transform term.

Similarly, runout compensation generator 520 retrieves the appropriate cosine term from the cosine table (TABLE 2 above) in ROM 309 for the sector number and multiplies the cosine term by the cosine runout factor retrieved from memory location 454 to form an inverse cosine transform term. The inverse cosine transform term and the inverse sine transform term are summed by runout compensation generator 520 to generate sector runout correction signal 521 for that sector. Specifically,:

$$\text{Sine Compensation}_S = SineFactor \cdot (\text{Sine Term})_S \quad (7)$$

where (Sine Term)$_S$=value in Table 1 for sector S; and $$\text{Cosine Compensation}_S = CosineFactor \cdot (\text{Cosine Term})_S \quad (8)$$

where (Cosine Term)$_S$=value in Table 2 for sector S.

$$\text{Runout Correction Signal}_S = \text{Sine Compensation}_S + \text{Cosine Compensation}_S \quad (9)$$

Gain adjustment means 530 multiplies sector runout correction signal 521 by the gain factor, as described above, to generate runout compensation signal 401. In this embodiment, actuator signal generator 420 sums runout compensation signal 401 for sector "i-1" with actuator adjustment signal 411 for sector "i" to generate runout compensated actuator signal 421 for sector "i", as explained above.

Also, as described above, the generation of actuator position adjustment signal 411 is well-known to those skilled in the art. Similarly, conversion of digital runout compensated actuator adjustment signal 421 to an analog signal and use of the analog signal to position read/write head 302 are well-known because the process is identical to the process that was previously used for the uncompensated actuator position adjustment signal.

After each sector in the track is processed in generate runout compensation step 702 of adaptive runout compensation method 700, processing returns to analyze runout and generate runout compensation step 701. In this step, the runout analysis and runout generation are again simultaneously performed.

For each of the predetermined number of analysis revolutions n in this step, runout compensator 520 uses the runout factors at locations 453 and 454 respectively to generate runout compensation signal 401 for each sector. Similarly, the accumulation of sine runout components and cosine runout components for the n analysis revolutions is started over. After each sector in the predetermined number of analysis revolutions n has been processed, runout analyzer 510 forms a new sine runout factor "SineFactor" using the new accumulated sine runout components in location 451 for the n analysis revolutions and a new cosine runout factor "CosineFactor" using the new accumulated cosine runout components in location 452 for the n analysis revolutions.

The new sine runout factor is added to the sine runout factor "SineFactor" in location 453 and the new cosine runout factor is added to the cosine runout factor "CosineFactor" in location 454 by runout analyzer 501. Thus, the two runout factors are accumulated over time while disk drive 300 is operating. This completes step 701 and processing transfers to step 702.

Figure 6B:
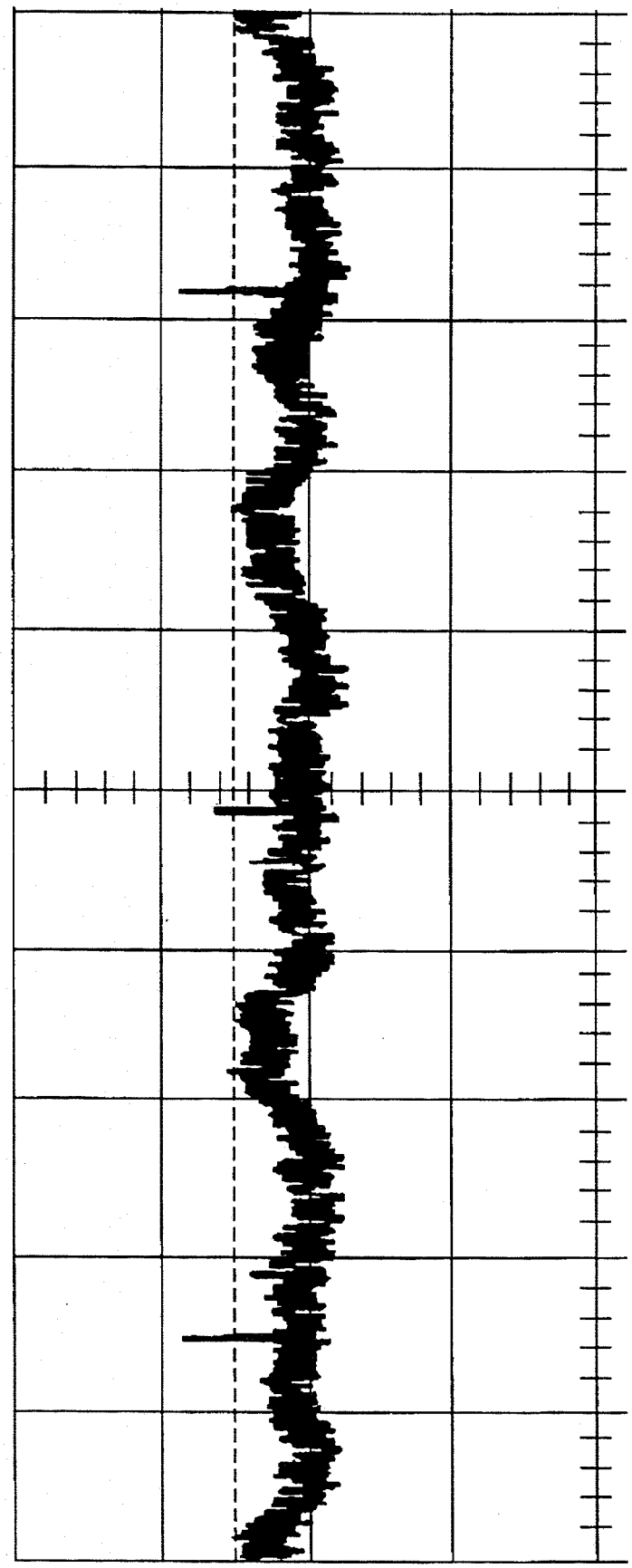
FIG. 6B illustrates the position error signal after the adaptive runout compensation method of this invention is used to process the signal of FIG. 6A.

FIG. 6B illustrates the position error signal after the position error signal of FIG. 6A is processed by adaptive runout compensation method 700 of this invention. Notice that the large harmonic oscillations are eliminated so that read/write head 302 is following the track centerline even though the center of disk 301 is displaced from the center of rotation 330.

The sampling provided by analyzing the runout for a predetermined number of revolutions reduces the effects of spurious noise and enhances the runout correlation. Similarly, the accumulation of the runout factors over time provides stability and assures that the runout compensation accurately follows the disk runout. If track position is lost due to a shock or any other reason, secondary servo compensator 400 is disabled until track position is reestablished.

The above embodiments are only illustrative to the principles of this invention are not intended to limit the inventions to the particular embodiments described. For example, the adaptive runout compensation method of this invention may be used in a read only system or in a system that uses other than a magnetic medium. These and other applications will be apparent to those skilled in the art in view of this disclosure.

We claim:

1. In a miniature disk drive with at least one disk and a servo system that includes a servo compensator that generates an actuator adjustment signal in response to a position error signal for positioning a read/write head over a track on said disk, a secondary servo system comprising:

analyzer means, responsive to said position error signal, for generating a runout factor wherein said analyzer means further comprises:
    a memory wherein is stored a cumulative runout factor; and
    means, responsive to said position error signal, for generating a new runout factor;
    wherein said analyzer means generates said runout factor using said stored cumulative runout factor and said new runout factor; and generator means, operatively coupled to said analyzer means, for generating a sector runout correction signal using said runout factor wherein said analyzer means and said generator means operate simultaneously during operation of said miniature disk drive thereby providing adaptive runout compensation for displacement of said at least one disk at any time during said operation.

2. The secondary servo system of claim 1 wherein said new runout factor generating means further comprises:

means, responsive to said position error signal, for generating a runout component for each sector in a predetermined number of revolutions of said disk.

3. The secondary servo system of claim 2 wherein said new runout factor generating means further comprises:

means, operatively coupled to said runout component generating means, for accumulating each of said sector runout components.

4. The secondary servo system of claim 3 wherein said new runout factor generating means further comprises:

means, operatively coupled to said accumulating means, for generating a new runout factor;
    wherein said new runout factor is generated upon accumulation of said sector runout components in said predetermined number of revolutions.

5. The secondary servo system of claim 1 further comprising:

gain generation means, operatively coupled to said generator means, for applying a gain factor to said sector runout correction signal to generate a sector runout compensation signal.

6. The secondary servo system of claim 5 further comprising:

actuator signal generation means, operatively coupled to said sector runout compensation signal and to said actuator adjustment signal, for generating a runout compensated actuator adjustment signal wherein the sector runout compensation signal for a first sector is combined with said actuator adjustment signal for a second sector that is different from said first sector.

7. In a miniature disk drive with at least one disk and a servo system that includes a servo compensator that generates an actuator adjustment signal in response to a position error signal for positioning a read/write head over a track on said disk, a secondary servo system comprising:

a memory;

analyzer means, responsive to said position error signal, for generating a new cosine runout factor and a new sine runout factor wherein said new cosine runout factor and said new sine runout factor are accumulated in said memory as an accumulated sine runout factor and an accumulated cosine runout factor respectively; and said accumulated sine runout factor and said accumulated cosine runout factor are a sine runout factor and a cosine runout factor respectively; and generator means, operatively coupled to said analyzer means, for generating a sector runout correction signal using said sine runout factor and cosine runout factor stored in said memory wherein said analyzer means and said generator means operate simultaneously during operation of said miniature disk drive thereby providing adaptive runout compensation for displacement of said disk from a true center of rotation of said miniature disk drive at any time during said operation.

8. The secondary servo system of claim 7 wherein said memory includes a sine table having a sine term for each of the sectors in a revolution of said disk, and a cosine table having a cosine term for each of the sectors in said revolution.

9. The secondary servo system of claim 8 wherein said analyzer means further comprises:

means, responsive to said position error signal, for generating a sector sine runout component during the sector period for each sector in a predetermined number of revolutions of said disk.

10. The secondary servo system of claim 9 wherein said sine runout component generating means further comprises:

means, operatively coupled to said memory and to said position error signal, for retrieving a sine term from said sine table and for multiplying said sine term by said position error signal to generate said sector sine runout component.

11. The secondary servo system of claim 10 wherein said analyzer means further comprises:

means, operatively coupled to said sector sine runout component generating means, for accumulating said sector sine runout components during said predetermined number of revolutions of said disk.

12. The secondary servo system of claim 11 wherein said analyzer means further comprises:

means, operatively coupled to said accumulating means, for generating a new sine runout factor;

wherein said new sine runout factor is generated upon accumulation of said sector sine runout components in said predetermined number of revolutions; and said new sine runout factor is added to said accumulated sine runout factor in said memory to obtain said sine runout factor.

13. The secondary servo system of claim 8 wherein said analyzer means further comprises:

means, responsive to said position error signal, for generating a sector cosine runout component during the sector period for each sector in a predetermined number of revolutions of said disk.

14. The secondary servo system of claim 13 wherein said cosine runout component generating means further comprises:

means, operatively coupled to said memory and to said position error signal, for retrieving a cosine term from said cosine table and for multiplying said cosine term by said position error signal to generate said sector cosine runout component.

15. The secondary servo system of claim 14 wherein said analyzer means further comprises: means, operatively coupled to said sector cosine runout component generating means, for accumulating said sector cosine runout components during said predetermined number of revolutions of said disk.

16. The secondary servo system of claim 15 wherein said analyzer means further comprises:

means, operatively coupled to said accumulating means, for generating a new cosine runout factor;
wherein said new cosine runout factor is generated upon accumulation of said sector cosine runout components in said predetermined number of revolutions; and
said new cosine runout factor is added to said accumulated cosine runout factor in said memory to obtain said cosine runout factor.

17. The secondary servo system of claim 8 wherein said generator means further comprises:

means, operatively coupled to said memory, for retrieving said sine runout factor and one of said sine terms in said sine table.

18. The secondary servo system of claim 17 wherein said generator means further comprises:

means, operatively coupled to said memory, for retrieving said cosine runout factor and one of said cosine terms in said cosine table.

19. The secondary servo system of claim 18 wherein said generator means further comprises:

means, operatively coupled to both of said retrieving means, for multiplying wherein said multiplying means multiplies said retrieved sine term and said sine runout factor to form a sine product and said multiplying means multiplies said retrieved cosine term and said cosine runout factor to form a cosine product.

20. The secondary servo system of claim 19 wherein said generator means further comprises:

means, operatively coupled to said multiplying means, for generating a sum wherein said sum generating means sums said sine product and said cosine product to generate said sector runout correction signal.

21. The secondary servo system of claim 7 further comprising:

gain generation means, operatively coupled to said generator means, for applying a gain factor to said sector runout correction signal thereby generating a sector runout compensation signal.

22. The secondary servo system of claim 21 further comprising:

actuator signal generation means, operatively coupled to said sector runout compensation signal and to said actuator adjustment signal, for generating a runout compensated actuator adjustment signal wherein the sector runout compensation signal for a first sector is combined with said actuator adjustment signal for a second sector that is different from said first sector.

23. A real-time method for adaptive runout compensation in a disk drive comprising:

(i) generating a runout factor using a new runout factor and a stored cumulative runout factor retrieved from a memory of said disk drive wherein said generating runout factor is performed by an analyzer in response to a positional error signal; and (ii) generating a sector runout correction signal using said runout factor wherein said generating said runout factor and said generating a sector runout correction signal are performed simultaneously during operation of said disk drive to provide said adaptive runout compensation for displacement of said disk at any time during said operation.

24. The method of claim 23 wherein generating a runout factor further comprises:

generating a sector runout component for each sector in a predetermined number of revolutions of a disk.

25. The method of claim 24 wherein generating a runout factor further comprises:

accumulating each of said sector runout components.

26. The method of claim 25 wherein generating a runout factor further comprises:

generating said runout factor upon accumulation of said sector runout components in said predetermined number of revolutions.

27. The method of claim 23 further comprising:

applying a gain factor to said sector runout correction signal thereby generating a sector runout compensation signal.

28. The method of claim 27 further comprising:

generating a runout compensated actuator adjustment signal wherein the sector runout compensation signal for a first sector is combined with an actuator adjustment signal generated by a servo compensator in said disk drive for a second sector that is different from said first sector.

29. The method of claim 24 further comprising:

a sine table having a sine term for each of the sectors in a revolution of said disk, and a cosine table having a cosine term for each of the sectors in said revolution in said memory of said disk drive.

30. The method of claim 29 wherein generating a runout factor further comprises:

generating a sector sine runout component during the sector period for each sector in said predetermined number of revolutions of said disk in response to a position error signal.

31. The method of claim 30 wherein said generating said sector sine runout component further comprises:

retrieving a sine term from said sine table and multiplying said sine term by said position error signal to generate said sector sine runout component.

32. The method of claim 31 wherein generating a runout factor further comprises:

accumulating said sector sine runout components during said predetermined number of revolutions of said disk.

33. The method of claim 32 wherein generating a runout factor further comprises:

generating a new sine runout factor upon accumulation of said sector sine runout components in said predetermines number of revolutions.

34. The method of claim 33 wherein generating a new runout factor further comprises:

generating a sector cosine runout component during the sector period for each sector in said predetermined number of revolutions of said disk in response to said position error signal.

35. The method of claim 34 wherein said generating said sector cosine runout component further comprises:

retrieving a cosine term from said cosine table and multiplying said cosine term by said position error signal to generate said sector cosine runout component.

36. The method of claim 35 wherein generating a runout factor further comprises:

accumulating said sector cosine runout components during said predetermined number of revolutions of said disk.

37. The method of claim 36 wherein generating a runout factor further comprises:

generating a new cosine runout factor upon accumulation of said sector cosine runout components in said predetermined number of revolutions.

38. The method of claim 37 wherein the generating of said sector runout correction signal further comprises:

retrieving one of said sine terms in said sine table, and retrieving one of said cosine terms in said cosine table.

39. The method of claim 38 wherein the generating of said runout correction signal further comprises:

multiplying said retrieved sine term and said sine runout factor to form a sine product and multiplying said retrieved cosine term and said cosine runout factor to form a cosine product.

40. The method of claim 39 wherein the generating of said runout correction signal further comprises:

summing said sine product and said cosine product to generate said sector runout correction signal.

41. The method of claim 40 further comprising:

applying a gain factor to said sector runout correction signal thereby generating a sector runout compensation signal.

42. The method of claim 41 further comprising:

generating a runout compensated actuator adjustment signal wherein the sector runout compensation signal for a first sector is combined with an actuator adjustment signal generated by a servo compensator in said disk drive for a second sector that is different from said first sector.

43. The method of claim 33 wherein generating a runout factor further comprises:

adding said new sine runout factor to an accumulated sine runout factor retrieved from said memory to from a sine runout factor.

44. The method of claim 37 generating a runout factor further comprises:

adding said new cosine runout factor to an accumulated cosine runout factor retrieved from said memory to form a cosine runout factor.

* * * * *